United States Patent
Sommer et al.

(10) Patent No.: US 7,355,733 B2
(45) Date of Patent: Apr. 8, 2008

(54) RECORDING MATERIAL MANAGEMENT IN A COPIER OR PRINTER

(75) Inventors: Monique Gerardine Miranda Sommer, Eindhoven (NL); Eduardus Josephus Willibrordus Van Vliembergen, Venlo (NL); Albert Ronald Matthias Eijlander, Venlo (NL)

(73) Assignee: Oce-Technologies B.V., Venlo (NL)

( * ) Notice: Subject to any disclaimer, the term of this patent is extended or adjusted under 35 U.S.C. 154(b) by 770 days.

(21) Appl. No.: 09/848,297

(22) Filed: May 4, 2001

(65) Prior Publication Data

US 2002/0051182 A1 May 2, 2002

(30) Foreign Application Priority Data

May 4, 2000 (EP) .................................. 00201602

(51) Int. Cl.
G06F 15/00 (2006.01)
G06K 1/00 (2006.01)

(52) U.S. Cl. ..................... 358/1.15; 358/1.15; 358/1.9; 358/1.14

(58) Field of Classification Search ...... 358/1.11–1.18, 358/1.1, 1.9
See application file for complete search history.

(56) References Cited

U.S. PATENT DOCUMENTS

| | | | | |
|---|---|---|---|---|
| 4,734,747 A | | 3/1988 | Okuda et al. | 358/468 |
| 4,954,910 A | | 9/1990 | Ueno | 358/296 |
| 5,061,958 A | * | 10/1991 | Bunker et al. | 399/81 |
| 5,081,595 A | | 1/1992 | Moreno et al. | 358/1.12 |
| 5,229,814 A | * | 7/1993 | Hube et al. | 399/14 |
| 5,459,580 A | * | 10/1995 | Suzuki | 358/296 |
| 5,835,820 A | | 11/1998 | Martin et al. | 399/85 |
| 5,903,362 A | | 5/1999 | Tanaka | 399/23 |
| 6,327,051 B1 | * | 12/2001 | Moro et al. | 358/1.9 |
| 6,850,337 B1 | * | 2/2005 | Anderson et al. | 358/1.15 |

\* cited by examiner

*Primary Examiner*—Gabriel Garcia
*Assistant Examiner*—Thierry L. Pham
(74) *Attorney, Agent, or Firm*—Birch, Stewart, Kolasch & Birch, LLP (57) ABSTRACT

Disclosed is a digital image production apparatus comprising: a print engine having a plurality of trays each of which is capable of accommodating different types of recording sheets; a user interface; and an electronic control system controlling print processing, including control of supply of recording sheets from the trays in accordance with sheet specifications of print jobs. Such a control system has access to a memory which stores for each tray the type of recording sheets presently accommodated therein, and when the type of recording sheet required for a job is not available in any of the trays, indicates, through the user interface, the required type of recording sheet and invites an operator to place recording sheets of the required type in a specific tray. In response to a confirmation signal which simply confirms that the operator has completed the requested action, the control system automatically stores information specifying the required type of recording sheet in a location of the memory associated with said specific tray. Such a confirmation signal would e.g. be generated when the operator presses the start button. Alternatively, the control system may leave the selection of a tray to the operator, in which case the confirmation signal should include an indication of the tray the operator has chosen.

21 Claims, 5 Drawing Sheets

Message from Printer No. 1

Your print job "AAVM 123/00" cannot be printed on this printer because the required paper type is not available.
Please insert paper of the following type:

A4, yellow, 80 g in tray no. 2 and press the start button.

The job is scheduled for being processed in 3 minutes.

( accept )   ( call operator )   ( select other paper )

*Fig.4*

Message to Key Operator of Printer No. 1

The paper type required for the print job "AAVM 123/00" ordered by Aart van Meeteren is not available.

Please insert paper of the following type:

A4, yellow, 80 g in tray no. 2 and press the start button.

The job is scheduled for being processed in 1 minute.

( select other paper )

*Fig.5*

WARNING

The paper type required for the print job "AAVM 123/00"
ordered by Aart van Meeteren is not available.
Please insert paper of the following type:

A4, yellow, 80 g in tray no. 2 and press the start button.

The job is scheduled for being processed in 3 minutes.

( different paper inserted )

*Fig.6*

WARNING

The paper type required for the print job "AAVM 123/00"
ordered by Aart van Meeteren is not available.
Please insert paper of the following type:

A4, yellow, 80 g in any of trays No. 2 or 3 and click on relevant button.

The job is scheduled for being processed in 3 minutes.

( tray no. 2 )  ( tray no. 3 )     ( different paper inserted )

RECORDING MATERIAL MANAGEMENT IN A COPIER OR PRINTER

FIELD OF THE INVENTION

The invention relates to a digital image production apparatus, and more particularly to such an apparatus comprising: a print engine having a plurality of trays each of which is capable of accommodating different types of recording sheets; a user interface; and an electronic control system for controlling print processing, including control of supply of recording sheets from the trays in accordance with sheet specifications of print jobs. And more particularly to such an apparatus wherein the control system: has access to a memory which stores for each tray the type of recording sheets presently accommodated therein; and when the type of recording sheet required for a job is not available in any of the trays, indicates, through the user interface, the required type of recording sheet and at least one tray for these recording sheets.

BACKGROUND OF THE INVENTION

The term "digital image production apparatus" is understood to mean an analogue copier having page programming for print media, a digital copier or a printer. In the following text, all these apparatuses will be referred to as "printer".

A known digital image production apparatus is disclosed in U.S. Pat. No. 5,081,595. The jobs to be printed may be scanned-in by a local operator or may be transmitted from a remote user through a network, and associated printing instructions are input by the local operator on an operating console of the printer or are also transmitted through the network. These printing instructions include a specification indicating the type of recording sheet on which the documents are to be printed. These recording sheets are distinguished not only by their size or format but also by a large variety of other parameters such as the material, e.g. paper or transparent film, the paper weight, paper color, surface finish and the like. Thus, the number of types of recording sheets which could possibly be used for printing is typically much larger than the number of trays provided in the printer.

As a consequence, a situation may occur where a job cannot be processed because the recording sheets specified by the job instructions are not available in any of the trays. Then, the user is invited to load the recording sheets that are needed for the job. In this context, the "user" does not necessarily mean the person who has entered the print job, which person may be located far away from the printer, but may also be an operator who is in charge of a printer.

It will be understood that a plurality of different types of recording sheets may be needed within one and the same print job. This is the case for example if cover sheets of the documents to be printed and/or separating sheets between them shall have a color different from the color of the other document sheets. If not all the recording sheets required for the job are available in the printer, the print processing has to be interrupted until the user or operator has loaded the required recording sheets.

The control system of the known printer includes also a scheduling software for arranging the print jobs in a print queue, if more than one job has to be processed. In this case, the user or operator may be invited to load the recording sheets needed for a subsequent print job while the print engine is processing a first job, so that the operation of the print engine does not need to be interrupted.

It may then be necessary for the operator to replace the recording sheets presently accommodated in one of the trays by another type. In order to avoid the user removing recording sheets from the print engine which are still needed for the current job or a subsequent job, the control system determines the trays which accommodate recording sheets that are needed for the scheduled print jobs, and indicates at least one or all of the other trays, i.e. the trays which may be reloaded, to the operator through the user interface.

U.S. Pat. No. 5,459,580 discloses a printer which has a sheet feeding mechanism and a register storing the type of recording sheet loaded in this sheet feeding mechanism. If the type of recording sheet specified by the job instructions is not identical with the type stored in the register, the print processing is interrupted, and the user is invited to load the required type of recording sheets. Then, after the user has loaded the required sheets and has programmed the type thereof, he must input a printing restart instruction, e.g. by pressing the start button of the printer, and the print processing is resumed.

The printers disclosed in the two U.S. patents discussed above are equipped with detectors which are able to detect the size of the sheets loaded in the various trays. However, since it would be difficult or even impossible to automatically detect also the other characteristics of the recording sheets, such as the color, the material, and the like, these characteristics have to be input manually by the user when he loads the recording sheets into one of the trays and the sheet feeding mechanism, respectively.

SUMMARY OF THE INVENTION

The invention, in part, provides a printing system having a user interface which is capable of simplifying and speeding up the process of loading the required type of recording sheets.

When, in the system according to the invention, the required sheets are not available, the control system selects a specific tray, invites the user to place the recording sheets of the required type in that specific tray, and automatically stores the required type of recording sheet in a location of the memory associated with said specific tray, in response to a confirmation signal which simply confirms that the operator has completed the requested action.

As a result, it is not necessary for the user to manually input all the characteristics such as material, color, and the like of the recording sheets that he loads into the tray. Instead, it is sufficient to input just a confirmation signal, e.g. by a single mouse click or by pressing the start button. Then, the control system will assume that the type of recording sheet that has been loaded by the user corresponds to the type that has been requested through the user interface, and that the user has actually loaded these recording sheets into the specific tray that had also been indicated through the user interface. In this context, it is important that the control system selects a specific tray, without leaving any choice to the user. Thus, the control system "knows" which type of recording sheet has been loaded into which tray, and it can appropriately update the contents of the memory automatically. In this way, the process of reloading recording sheets is greatly simplified and sped-up, and the likelihood of input errors is reduced.

Preferably, the trays of the printer are ordered by preferences, so that, if more than one tray is empty or includes sheets that are not needed for any of the scheduled jobs, the user will be prompted to load the required sheets into the tray which, among these, has the highest preference. This will for example be the tray which allows for the highest processing speed of the printer and/or can most conveniently be accessed by the user. The order of preferences may also be made variable depending on other printing parameters such as duplex or simplex printing or in view of specific constraints such as, for example, the constraint that sheets above a certain size, e.g. A3 or larger, can only be loaded in some of the trays.

The information on the type of sheet to be loaded and on the selected tray may be presented to the user in the form of a dialog window on a display screen, preferably on the operating console of the printer, but additionally, it may be shown on a remote user workstation.

Since the trays of a printer are normally equipped with detectors detecting the presence or absence of recording sheets, it is also possible in a modified embodiment of the invention to use the signals from these detectors for generating the confirmation signal. If the selected tray was empty, the signal indicating the presence of recording sheets will be taken as the confirmation signal. And if the tray was loaded with sheets of the wrong type, the confirmation signal can be a signal indicating the absence of sheets in that tray (removal of the wrong sheets), followed by a signal indicating again the presence of sheets in that tray.

In case a user wants to load recording sheets of a type that has not been requested by the control system of the printer, the user interface can offer the possibility to call-up a dialog window on the display screen for specifying the characteristics of these sheets and designating the tray into which they are loaded.

Such a dialog window could also be used when the operator does want to load the requested paper type. In that case, the invention provides for a simple way of specifying the type of the inserted recording sheets.

In the background art systems, the details of the specification must all be inputted in a number of separate selections. Instead, according to the present invention, the control system invites an operator to place the recording sheets of the required type in one of said trays, at his own choice, and to specify through the user interface the specific tray he has filled, and automatically stores the required type of recording sheet in the memory location associated with said specific tray upon an operator command from the user interface. Accordingly, the operator can specify the paper type in a single keystroke.

In a printing system with remote users, the invitation to reload recording sheets may be sent not only to the pertinent user but also to a key operator who is in charge of the printer. In this case, it is preferable that the invitations are sent to the user and the operator at different timings. For example, the invitation may first be sent to the user, and if the user does not respond within a certain time interval, it is sent to the key operator who will then reload the recording sheets. This has the advantage that, on the one hand, the burden on the key operator is limited, and on the other hand it is made sure that the print processing will not be interrupted for an unreasonably long time.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention. Preferred embodiments of the invention will be described below in conjunction with the accompanying drawings, in which.

DETAILED DESCRIPTION OF PREFERRED EMBODIMENTS

Figure 1:
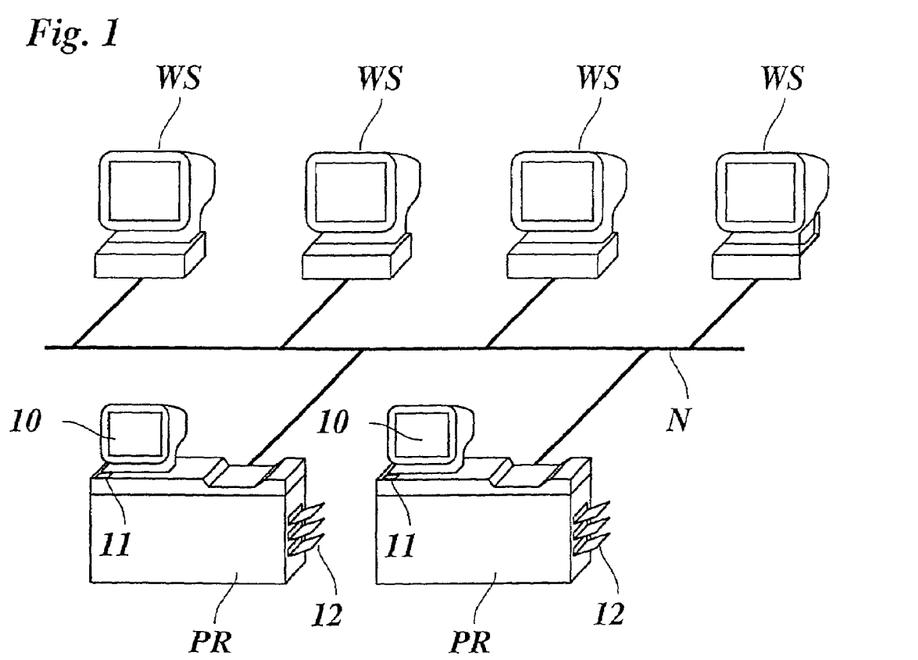
FIG. 1 is a block diagram of a printing system in which the invention is used.

FIG. 1 shows a system of workstations WS and printers PR connected by a local network N. The workstations are, for example, PC's and in each case can be equipped with a processing unit, a screen, a keyboard and a mouse (or some other pointing device). The printers are digital copying machines each comprising a scanner, a print engine, a local terminal and a connection unit (digital access controller or DAC) for connection to the network and processing print jobs sent from the workstations. In addition, it is possible to use machines which only have a printer function. All these machines, copying machines and printers, are hereinafter referred to as "printer". Users wishing to have a specific data file printed from their workstation, can for the purpose choose from a number of, or even all, the printers of the system.

In the example shown, each printer has as an operating console or local terminal 10, a start button 11 and three trays 12 which may be loaded with recording sheets of various kinds. The trays 12 are arranged one above the other and are e.g. numbered from top to bottom, so that the uppermost tray of each printer is designated as tray number No. 1, the middle tray is designated as tray No. 2 and the lowermost tray is designated as tray No. 3.

Figure 2:
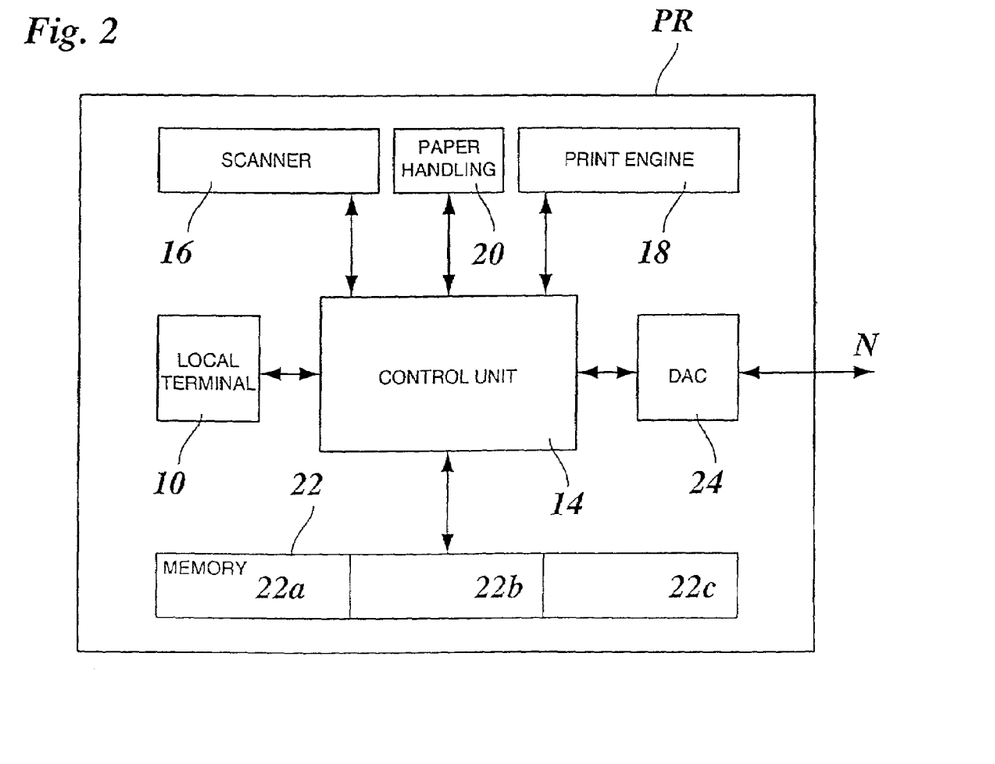
FIG. 2 is a block diagram of one of the printers in the printing system shown in FIG. 1.

As is shown in FIG. 2, each printer PR has an electronic control unit 14 which may be formed by a digital computer loaded with software for controlling all the functions of the printer. More particularly, the control unit 14 controls the operation of the scanner 16, the print engine 18 and a paper handling system 20 which feeds the recording sheets from a selected one of the trays 12 through the printer and further to a discharge tray (not shown). The control unit 14 further communicates with the local terminal 10 of the printer, a memory 22 and, through the DAC 24, with the workstations WS and the other printers connected to the network N.

The memory 22 has a number of memory locations 22a, 22b, 22c corresponding to the number of trays 12 provided in the printer. Each of these memory locations stores information on the type of recording sheet that has been loaded in the associated tray 12. This information comprises for example the size of the sheets, the material (e.g. paper or transparent film), the color, the paper weight and other relevant characteristics of the sheet, so that the type of sheet is uniquely defined by the information stored in the respective memory location. Some of these characteristics, for example, the size, may be automatically detected by detectors (not shown) arranged in the trays 12, as is generally known in the art, whereas other characteristics can be input by a user or operator through the local terminal 10. The memory 22 can be a non-volatile memory, so that the information will not be lost when the power supply to the printer is interrupted.

The print engine 18 may include conventional electrophotographic print process technology, in which a photoconducting medium is first charged, then exposed imagewise using a laser or LED-bar and then developed with toner powder. The toner image that is thus formed in the medium is transferred to a recording sheet and fixed thereon by heat. Such electrophotographic systems are well-known in the art and therefore a more detailed description is omitted for brevity.

When a user wants to print a data file from one of the workstations WS, he selects one of the printers PR for executing the print job and sends the print job to this printer through the network N. The data of the print job are then received by the DAC 24 of the selected printer and are forwarded to the control unit 14 of that printer. These data include printing instructions specifying printing parameters such as the number of copies and, among others, the type or types of recording sheet on which the data are to be printed.

In a copy mode, the data to be printed are scanned-in with the scanner 16, and the associated printing instructions are input through the local terminal 10 of the printer. The print job thus created will normally be processed by the print engine 18 of the same printer PR, but may optionally also be transmitted to another printer.

When a print job is input to the printer PR either through the local scanner 16 or through the network N, while this printer is still busy with another job, a scheduling software implemented in the control unit 14 schedules the print jobs, i.e. arranges the print jobs in a printing queue. For example, the sequence of the jobs in the print queue may correspond to the sequence in which the jobs have been input. Optionally, this sequence may be altered depending on different priorities assigned to the various jobs.

It may be assumed that a key operator is appointed for each of the printers PR. This operator is a user who is particularly in charge of this specific printer in order to, for example, remove paper jams and load the required recording sheets into the trays 12. This key operator may also have authority to alter the printing queue by overriding the automatic scheduling process. For example, the key operator may be authorized to interrupt a running job in order to execute another job with higher priority in-between. The key operator may have access to the printer through the local terminal 10 of the printer or through one of the workstations WS which, for convenience, should be located not too far away from the printer. In the latter case, the network address of the operator's workstation is set in the control unit 14 of the printer, so that messages addressed to the operator can be sent to the correct location.

The software for controlling communication with the operator and with the other users through the local terminal 10 and/or through the network is implemented in the control unit 14. This software, together with the local terminal and the workstations, forms the user interface of the printing system.

The control units 14 of the various printers PR may also be configured to communicate with each other, so that the control system of the complete system shown in FIG. 1 is formed by the co-operating control units of the various printers.

Figure 3:
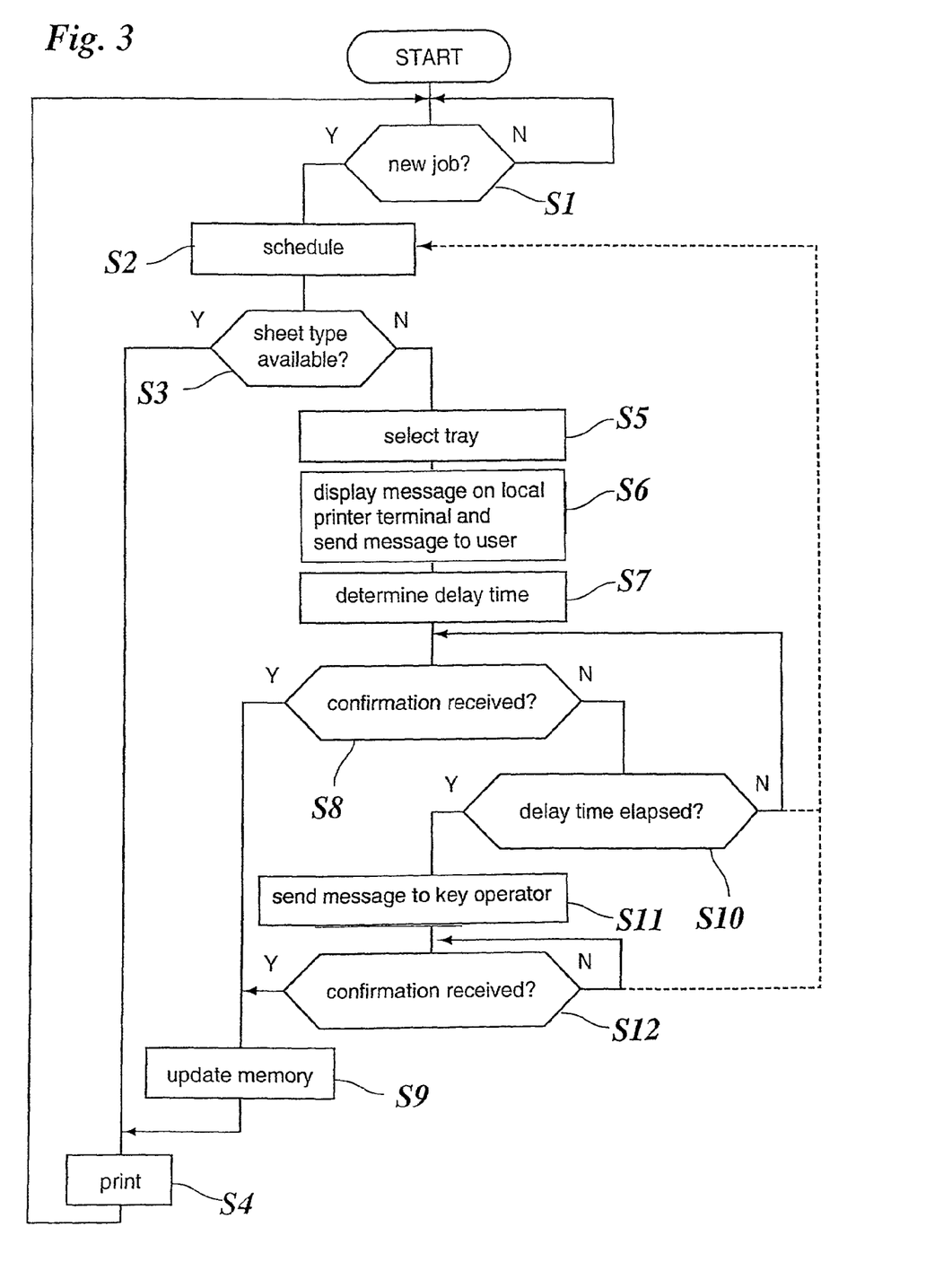
FIG. 3 is a flow chart illustrating a function of the control system of a printer in accordance with the invention.

FIG. 3 illustrates a high level control program which is executed by the control unit 14 and which calls up the functions of the user interface as well as the software components controlling the physical functions of the printer.

For simplicity, the control program shown in FIG. 3 is limited to the aspect of recording sheet management in the printer control program and, in particular, to the steps taken in case the type of sheets required for a print job are not available. In that case, the print process is stopped automatically and an operator must remove the disturbance by filling the required copy sheets into one of the paper trays 12. It should, however, be understood that the present invention covers all kinds of disturbances of the print process, that can be removed by a normal operator. Such disturbances include, for instance, non-availability of staples when the print job specification requires stapling, or a paper jam in the print engine. Also, the output tray of the printer may become full, in which case the print process is stopped automatically. The modifications to the flow sheet of FIG. 3 are obvious and are therefore considered well within the capabilities of the skilled person.

In step S1, which is cyclically repeated in a waiting loop, the control unit checks whether a new job has been entered. When a new job is received, the program branches to a scheduling step S2 where the new job is added to the print queue. Of course, if the printer was idling, the scheduling step S2 is trivial, and the new job can be processed immediately.

In a subsequent step S3, the control unit checks the printing instructions of the new job in order to identify the type or types of recording sheet that are needed for this job, and by comparing this type or these types with the types presently stored in the memory 22, it is decided whether or not the necessary sheet types are available. If all the sheet types needed are already loaded in the trays 12, the processing of the new job can readily be started in step S4, as soon as the jobs preceding in the print queue have been completed.

If, however, at least one necessary sheet type is not available, the program branches to step S5, where the program automatically selects one of the trays 12 for accommodating the sheets that have to be loaded. If only one of the trays 12 is empty, the empty tray will be selected. If two trays are empty, the higher one of the trays, i.e. the tray with the lower number will be selected. If no tray is empty, the program at first identifies the trays which accommodate sheets that are needed for anyone of the print jobs that have been scheduled. If there is at least one tray including sheets that are not needed, the highest one of the trays is selected. If the sheets in all three trays are still needed, the selection has to be postponed until the print queue has been processed to such an extent that the sheets in one of the trays are not needed any longer. Then, this tray will be selected.

There may also occur a situation in which the job for which the step S3 has been executed is not the last job in the print queue. This may happen for example if the processing of a job has been interrupted in order to process another job in-between. Then, it may also be checked, which trays will be needed for the subsequent jobs, in order to reduce the number of reloading processes to minimum.

Once a specific tray has been selected in step S5, a message indicating this tray and the type of sheet to be loaded thereinto is sent to the user in step S6. If the print job has been scanned-in at the printer, this message will be sent to, and displayed on, the local terminal 10 of the printer only. If the print job has been entered from a workstation, as will be assumed here, then the message is sent to both this workstation and the local printer terminal 10. If there are no jobs preceding the present job in the print queue or if all preceding jobs have been completed, the control unit will stop the printer.

Alternatively, the control unit may put the current job into a waiting state and start a subsequent job from the print queue that can be printed, if such a subsequent job is present.

In an alternative embodiment, when the control unit determines that not all sheet types required for the job are available in the paper trays, but that the sheet type required first is present in one of the trays, it does not stop the printer until a sheet type that is not available is actually needed. This embodiment is necessary for printing jobs that require more sheet types than the number of paper trays, since otherwise such jobs would not be processable, but may also be practical in other cases.

In step S7, a delay time is determined. This delay time corresponds to the time which is given to the user for making his way to the printer and loading the required sheets into the specified tray.

Then, it is checked in step S8 whether the required action has been completed and confirmed, by restarting the printer, i.e., by pressing the start button 11 on the print engine. If such confirmation has been received, it can be assumed that the selected tray now contains the type of sheet that has been specified in the message, and, in step S9, the characteristics identifying this type of sheet are stored in the corresponding location of the memory 22 so as to update the memory. In this way, the control unit always keeps track of any changes of the contents of the trays 12, so that the information stored in the memory 22 will always represent the actual status of the trays, without any need for the user to input the characteristics of the sheets that have been loaded.

From step S9, the program proceeds to step S4 for processing the print job in accordance with the print queue.

When it is found in step S8 that the user has not yet restarted the printer, it is checked in step S10 whether the delay time determined in step S7 has elapsed. If the delay time has not yet elapsed, the program loops back to step S8, so that the check in step S8 is repeated. If the delay time has elapsed, e.g. because the workstation user has not received the message or is not willing to respond thereto, then, in order to limit the time for which the job processing is interrupted, a message identifying the selected tray and the necessary type of recording sheet is sent to the key operator in step S11. Then, it is checked in step S12 whether the key operator has completed the required action and has confirmed this by restarting the printer. If this is the case, the program proceeds with steps S9 and S4. Otherwise, this step S12 is repeated, until a positive result is obtained.

Alternatively, when neither the user nor the key operator respond, the current print job may be postponed and rescheduled, so that the next print job in the queue may be processed first as is symbolized by broken lines in FIG. 3.

Of course, the steps S6 to S10 may be skipped, e.g. if the job has been sent from the local terminal or the workstation that is assigned to the key operator himself.

Figure 4:
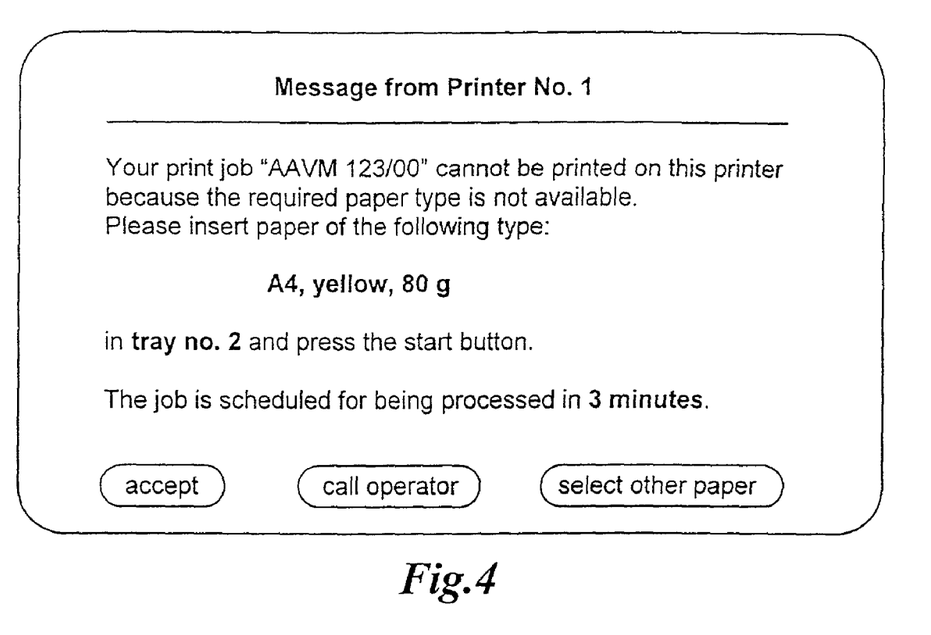
FIG. 4 is a dialog to be presented to a user of the printing system according to an embodiment of the invention.
Figure 5:
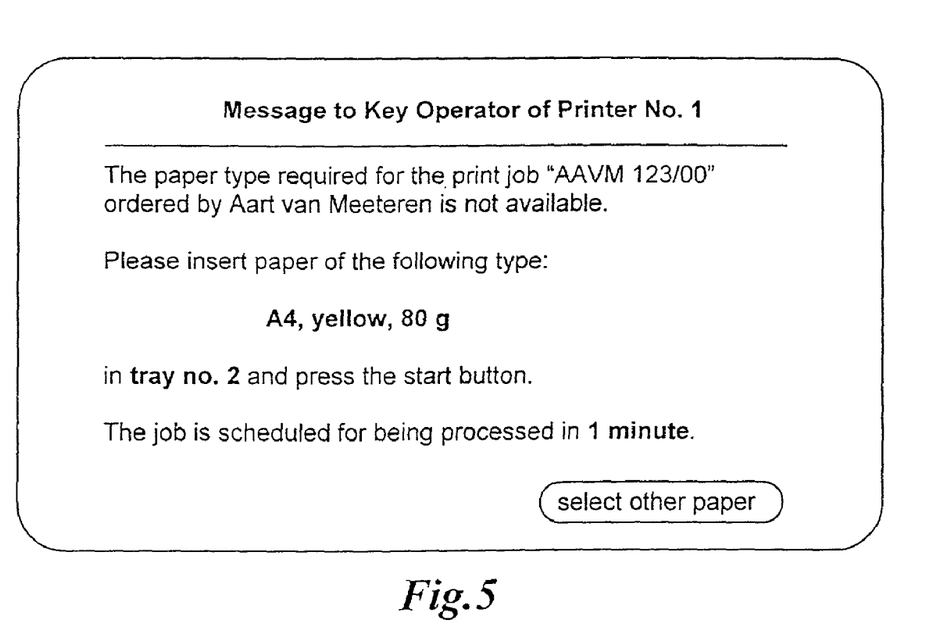
FIG. 5 is a dialog to be presented to the key operator of a printer according to an embodiment of the invention.
Figure 6:
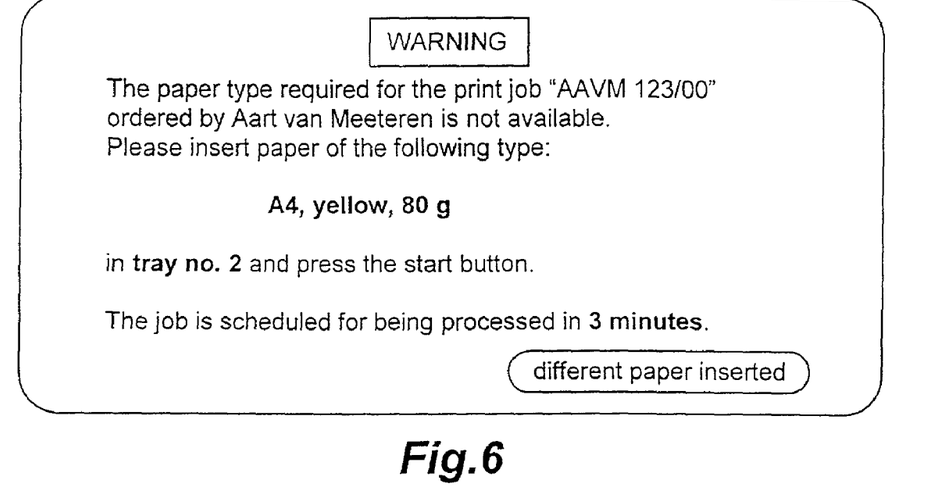
FIG. 6 is a dialog to be presented to a user on the local printer terminal according to an embodiment of the invention.

The message sent to the user in step S6 may be in the form of a dialog an example of which is shown in FIG. 4. Preferably, this dialog is displayed forcibly on the monitor screen of the user workstation, or the user is forcibly alerted of this message by an acoustic signal and/or a blinking icon or the like, regardless of whether or not the user has activated a print monitor function. Alternatively, the alert may be part of a print monitor function that is automatically activated upon submission of a print job to the printer. The message sent to the key operator may have substantially the same appearance. An example of this message is shown in FIG. 5. An example of the message displayed on the local printer terminal 10 is shown in FIG. 6.

The dialog shown in FIG. 4 identifies, in the headline, the printer from which the message has been sent. It further identifies the job to which the message refers. In the example shown, the sheet type is identified by the size (A4), the color (yellow) and the paper weight (80 g) of the recording sheets to be loaded.

As can be seen, the message invites the user to insert recording sheets of the specified type in the selected tray (tray No. 2) and to press the "print" button. The "print" button refers to the start button 11 of the printer. A physical depression of the start button 11 will have the effect that the program shown in FIG. 3 proceeds from step S8 to step S9.

The example of a dialog shown in FIG. 4 includes some additional functionality. If the job is not ready to be processed immediately, because preceding jobs in the print queue still have to be processed, the dialog indicates the scheduled processing time for the job, so that the user knows how much time is left for replacing the sheets.

An "accept" button in the dialog enables the user to signal to the control unit of the printer that he has received the message and is willing to respond thereto. This may optionally cause the control unit of the printer to extend the delay time that had originally been determined in step S7, so that the key operator will not be called unnecessarily. If it is not possible for the user to respond to the message himself, he may click the button "call key operator" which has the effect that step S11 in FIG. 3 is executed immediately, without waiting for the lapse of the delay time.

Another option offered in the dialog is to select another type of recording sheet for the print job. A mouse click on the corresponding button will open another dialog informing the user of the types of recording sheet presently available in the printer and offering him a possibility to select among these sheets.

The message to the key operator shown in FIG. 5 has essentially the same contents as the message shown in FIG. 4, but also indicates the user who has ordered the print job.

In the message on the local printer terminal 10, shown in FIG. 6, there is also a soft button for specifying that a paper type other than the request by the machine is inserted. If, in the example shown, yellow 80 g-paper in the format A4 is not available for the operator, then the message cannot be complied with. Possibly, A4 paper with a slightly different weight or color, e.g. pink, is available and could be inserted into the selected tray, so that the user specifications could be fulfilled with only minor modifications. However, since the control unit 14 assumes that yellow 80 g-paper is loaded, the change in the type of paper must be notified to the control unit so as to correct the contents of the memory 22. This is achieved by pressing the "different paper inserted" button on the local terminal 10, which opens a dialog prompting the operator to enter the characteristics of the sheets that are actually loaded. Only in this exceptional case is it necessary for the operator to change the contents of the memory 22 manually.

The description given above considers only the case that the lack of the correct recording sheets is detected in step S3, i.e., at a time before the processing of the job has started. It will be understood however that the sequence of steps S5 to S12, S9 and S4 can also be called up when the processing of the job has started already but is interrupted because the pertinent tray has run empty. Then messages analogous to those shown in FIGS. 4 and 5 will be issued, inviting the user and possibly the key operator to refill the empty tray.

Provided that the printer is equipped with sensors detecting or at least roughly estimating the number of sheets present in each tray, such messages may also be issued in advance, if the stock of sheets in the pertinent tray is not sufficient for completing the job.

The system described above may further be modified or extended in various ways.

For example, a scheme for determining the delay time in step S7 may be configured by the key operator and/or by the user in order to fit the specific conditions of the system environment and the habits of the users. The delay time may also be varied dynamically, depending on, for example, the time left until the print job is scheduled for printing.

Further, it is possible to modify the system such that a message is sent to the key operator first and is only sent to the user if the key operator has not responded within the specified delay time.

As another possible modification, already mentioned hereinbefore, the flow diagram shown in FIG. 3 may be changed in that the program loops back to the scheduling step S2 if the check in step S10 or S12 has had a negative result, as is symbolized by broken lines in FIG. 3. Thus, if the user and/or the key operator has failed to respond to the message in time, the job in question would be rescheduled and would, for example, be placed at the end of the print queue, so that more time is available for supplying the necessary sheets, and the processing of other jobs, for which the sheets are available already, will not be delayed.

Figure 7:
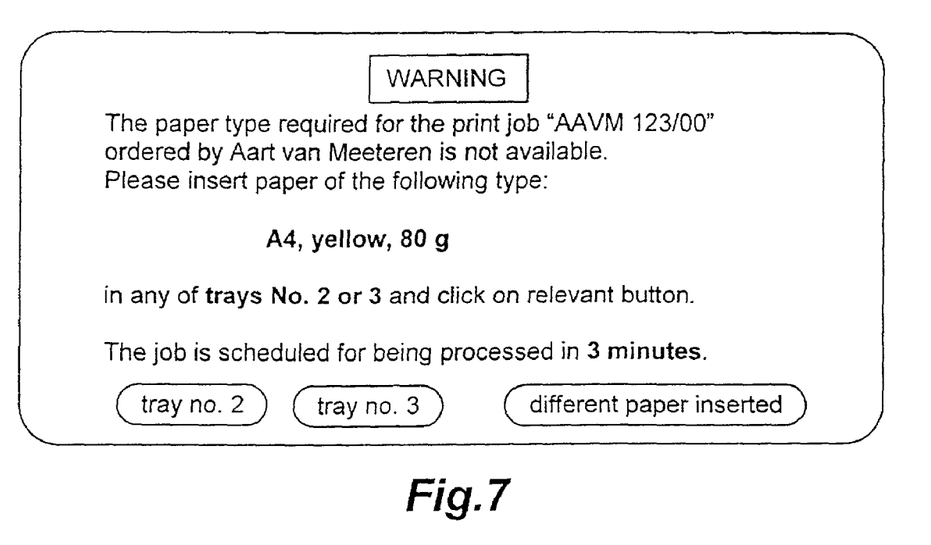
FIG. 7 is a dialog to be presented to a user on the local printer terminal, for a second embodiment of the invention.

In yet another embodiment, the control unit 14 may leave the choice of the paper tray to the operator, or at least may propose more than one possible tray from which the operator may choose. In that embodiment, the operator must indicate to the control unit 14, which tray he has chosen. This can e.g. be accomplished by offering soft keys specifically designed for the purpose on the local printer terminal 10. FIG. 7 shows such keys indicating the trays 2 and 3 from which the operator could, in that example, choose. In case the choice of the paper tray is left entirely free for the operator, step S5 in FIG. 3 relating to selecting a paper tray is superfluous and may be left out. Upon the input of the tray indication by the operator, the control unit 14 updates the data in the relevant one of the memory locations 22*a, b* or *c.*

Figure 8:
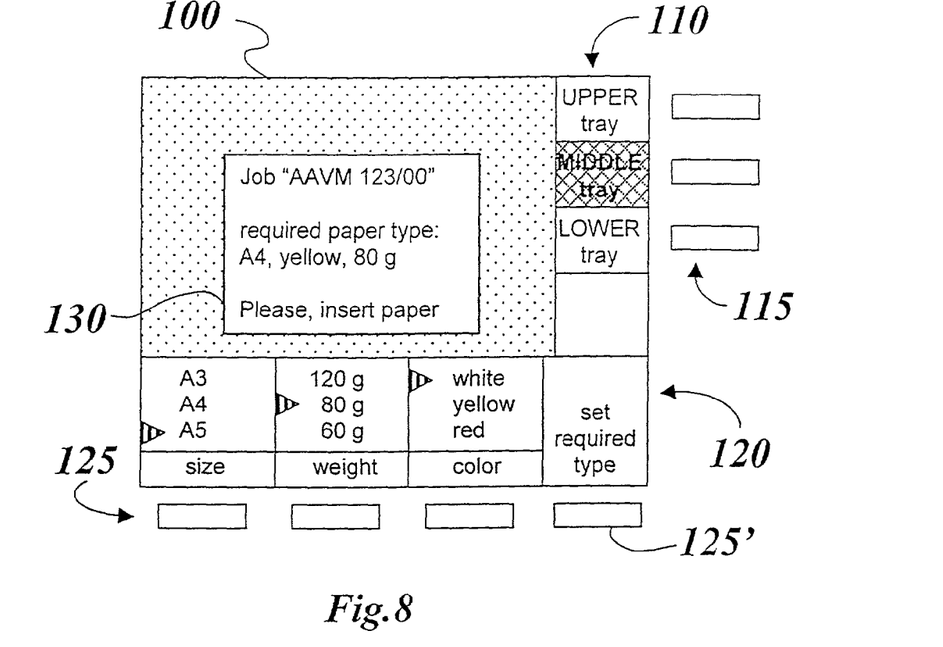
FIGS. 8 and 9 are local terminal display images relating to an alternative form of the second embodiment of the invention.
Figure 9:
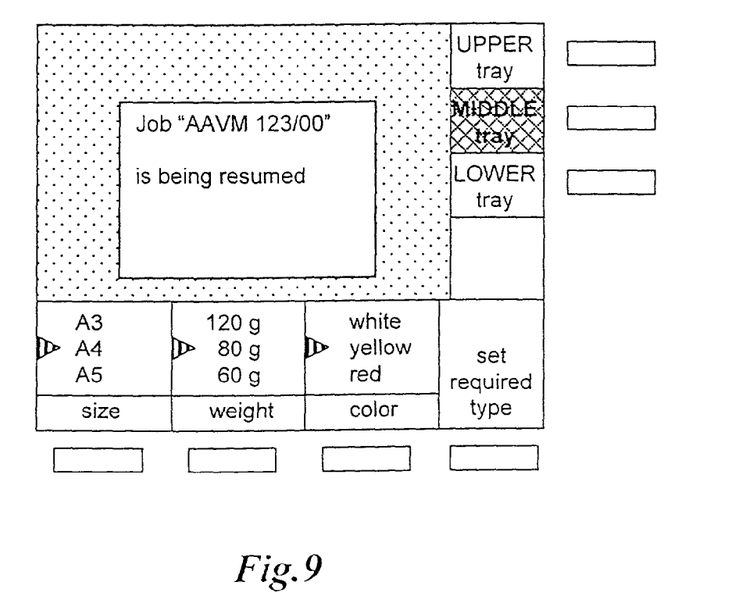

Another example of an implementation of the last-mentioned embodiment is shown in FIGS. 8 and 9.

FIG. 8 is a representation of a relevant part of the display area of the local printer terminal 10, in a "Paper Manager" mode of the control module 14, in which an operator may designate paper types for the paper trays 12. This display image may be called up by the operator, either using a fixed (soft) key on the local terminal 10 or by actuating the soft key "different paper inserted" shown in FIGS. 6 and 7, or else may automatically pop up when the required paper type appears not to be available at run time.

The display image includes a message area 100, a paper tray selection area 110 and a paper type selection area 120.

The paper tray selection area has selection fields for specification of a tray, either in the form of touch-sensitive areas on the display or in the form of tags referring to a closely located physical key (denominated 115). The actual content of a selected paper tray is shown in the paper type specification area 120, which includes the properties of the particular type of paper loaded therein, namely size, weight and color (in this example). Keys 125 may be used by an operator to specify the type of paper he has just inserted. The size specification is grayed, because the paper size is sensed automatically by sensors in the paper trays and cannot be specified otherwise. Keys 125 include a key 125', called "set required type". In the example of FIG. 8, the middle paper tray is selected and happens to contain A5, white, 80 g paper sheets.

Now, in the case that a print job needs a type of paper that is not contained in any of the trays, the print job cannot start or it cannot continue, depending on the situation. At that moment, the control unit 14 displays a message in the message area 100 of the terminal 10, specifying the required paper type.

Assuming that the operator has chosen the middle paper tray, he may then select that tray by pushing the appropriate key 115, insert the required paper in the tray (after having removed the paper that was originally contained therein) and simply push key 125'. In reaction, the control unit 14 automatically updates the data in the relevant one of the memory locations 22 *a, b* or *c,* and shows the updated tray content data in the specification area 120 as shown in FIG. 9. Then, the print job is resumed.

It should be understood that the above explanation of the present invention is only an example. The skilled person will understand that other embodiments are also possible within the scope of the appended claims. These embodiments are considered to be equally protected by the patent.

The invention claimed is:

1. A digital image production apparatus comprising:
   a print engine;
   a plurality of trays each of which is capable of accommodating different types of recording sheets;
   a user interface; and
   an electronic control system for controlling print processing, including control of supply of recording sheets from the trays in accordance with sheet specifications of print jobs,
   wherein the control system has access to a memory which stores for each tray the type of recording sheets presently accommodated therein, and
   wherein, when recording sheets of a type required for a job are not available in any of the trays, the control system:
   indicates, through the user interface, the required type of recording sheet;
   selects an eligible tray that can accommodate the required recording sheets;
   invites, through the user interface, an operator to place recording sheets of the required type in the eligible tray; and
   automatically, in response to receiving a confirmation signal which confirms that the operator has completed the requested action, assumes that the installed recording sheets are of the required type and stores information specifying the required type of recording sheet in a location of the memory associated with said eligible tray.

2. The apparatus according to claim 1, wherein, if at least one tray contains sheets of a type that is not needed for the current job nor any other job scheduled for processing so as to represent at least one non-targeted tray, the control system selects one of the at least one non-targeted trays as the eligible tray.

3. The apparatus according to claim 1, wherein the confirmation signal is a signal indicating that a start button of the apparatus has been actuated.

4. The apparatus according to claim 1, wherein the required type of recording sheet and the eligible tray are presented to the user in the form of a dialog on a display screen of the user interface.

5. The apparatus according to claim 1, further including means for replicating the user interface on a display screen of a workstation connected to the printer through a network.

6. The apparatus according to claim 5, wherein, when the workstation is online, the message indicating a request for loading recording sheets for a specific print job is forcibly offered to the user on the workstation, irrespective of whether or not a print monitor function is activated in the workstation.

7. The apparatus according to claim 5, wherein the apparatus is connected, through the network, with at least two user terminals, and wherein the message indicating the required type of recording sheet and the eligible tray is sent to at least two of said user terminals at different timings.

8. A digital image production apparatus comprising:
a print engine;
a plurality of trays each of which is capable of accommodating different types of recording sheets;
a user interface; and
an electronic control system for controlling print processing, including control of supply of recording sheets from the trays in accordance with sheet specifications of print jobs,
wherein the control system has access to a memory which stores for each tray the type of recording sheets presently accommodated therein, and
wherein, when recording sheets of a type required for a job are not available in any of the trays, the control system:
indicates, through the user interface, the required type of recording sheet and at least one eligible tray that could be used to accommodate the required recording sheets;
invites an operator to place the recording sheets of the required type in one of said eligible trays and to specify through the user interface the specific eligible tray he has filled; and
automatically, in response to a signal generated by the operator specifying said specific tray, assumes that the installed recording sheets are of the required type and stores information specifying the required type of recording sheet in a location of the memory associated with said specific eligible tray.

9. The apparatus according to claim 8, wherein an eligible tray is a tray containing sheets of a type that is not needed for the current job nor any other job scheduled for processing, if any.

10. The apparatus according to claim 8, wherein the signal generated by the operator is a signal indicating that an eligible tray contains sheets and which is received after a signal indicating that the same eligible tray was empty.

11. The apparatus according to claim 8, wherein the required type of recording sheet and the eligible trays are presented to the user in the form of a dialog window on a display screen of the user interface.

12. A digital image production apparatus comprising:
a print engine;
a plurality of trays each of which is capable of accommodating different types of recording sheets;
a user interface; and
an electronic control system for controlling print processing, including control of supply of recording sheets from the trays in accordance with sheet specifications of print jobs,
wherein the control system has access to a memory which stores for each tray the type of recording sheets presently accommodated therein, and
wherein, when recording sheets of a type required for a job are not available in any of the trays, the control system:
indicates, through the user interface, the required type of recording sheet;
invites an operator to place recording sheets of the required type in one of said trays and to specify through the user interface the specific tray he has filled; and
automatically, upon an operator command for the purpose from the user interface, stores information specifying the indicated type of recording sheet in a location of the memory associated with said specific tray.

13. The apparatus according to claim 1, wherein said job is a job that is about to start, and the control system, in response to receiving said confirmation signal, also starts up print processing of the job.

14. The apparatus according to claim 8, wherein said job is a job that is about to start, and the control system, in response to receiving said confirmation signal, also starts up print processing of the job.

15. The apparatus according to claim 12, wherein said job is a job that is about to start, and the control system, in response to receiving said confirmation signal, also starts up print processing of the job.

16. The apparatus according to claim 1, wherein said job is a job that has been started, and the control system, in response to receiving said confirmation signal, also re-starts print processing of the job.

17. The apparatus according to claim 8, wherein said job is a job that has been started, and the control system, in response to receiving said confirmation signal, also re-starts print processing of the job.

18. The apparatus according to claim 12, wherein said job is a job that has been started, and the control system, in response to receiving said confirmation signal, also re-starts print processing of the job.

19. The apparatus according to claim 1, wherein the control system further stores characteristics identifying the type of sheet in a corresponding location of the memory.

20. The apparatus according to claim 8, wherein the control system further stores characteristics identifying the type of sheet in a corresponding location of the memory.

21. The apparatus according to claim 12, wherein the control system further stores characteristics identifying the type of sheet in a corresponding location of the memory.

* * * * *